(12) United States Patent
Robertson et al.

(10) Patent No.: US 6,651,083 B1
(45) Date of Patent: Nov. 18, 2003

(54) DISTRIBUTED SERVICE REQUEST SYSTEM FOR PROVIDING FAIR ARBITRATION USING TOKEN PASSING SCHEME TO RESOLVE COLLISIONS

(75) Inventors: Iain Robertson, Bedfordshire (GB); Amarjit S. Bhandal, Northants (GB); John Keay, Bedfordshire (GB)

(73) Assignee: Texas Instruments Incorporated, Dallas, TX (US)

(*) Notice: Subject to any disclaimer, the term of this patent is extended or adjusted under 35 U.S.C. 154(b) by 706 days.

(21) Appl. No.: 09/615,172

(22) Filed: Jul. 13, 2000

(30) Foreign Application Priority Data

Jul. 16, 1999 (GB) .............................................. 9916704

(51) Int. Cl.[7] .............................................. G06F 13/36
(52) U.S. Cl. ...................................... 709/107; 710/240
(58) Field of Search ................................ 370/455, 545, 370/460; 711/170; 709/251; 710/107

(56) References Cited

U.S. PATENT DOCUMENTS 3,629,854 A * 12/1971 Hauck et al. .............. 710/123
4,926,419 A * 5/1990 Whipple ..................... 370/447
5,088,024 A * 2/1992 Vernon et al. .............. 710/111
6,496,740 B1 * 12/2002 Robertson et al. ........... 700/20

FOREIGN PATENT DOCUMENTS

EP          84114279.7      11/1984      .......... H04L/11/16
EP          0 147 644 A2    7/1985

* cited by examiner

Primary Examiner—Meng-Al T. An
Assistant Examiner—Philip Lee
(74) Attorney, Agent, or Firm—Robert D. Marshall, Jr.; W. James Brady, III; Fredrick J. Telecky, Jr.

(57) ABSTRACT

A transfer request bus (25) is described which is suitable for use in a data transfer controller processing, multiple concurrent transfer requests despite the attendant collisions which result when conflicting transfer requests occur. Transfer requests are passed from an upstream transfer request node (318) to downstream transfer request node (300) and thence to a transfer request controller with queue (320). At each node a local transfer request can also be inserted to be passed on to the transfer controller queue. Collisions at each transfer request node are resolved using a token passing scheme wherein a transfer request node possessing the token allows a local request to be inserted in preference to the upstream request.

19 Claims, 5 Drawing Sheets

DISTRIBUTED SERVICE REQUEST SYSTEM FOR PROVIDING FAIR ARBITRATION USING TOKEN PASSING SCHEME TO RESOLVE COLLISIONS

TECHNICAL FIELD OF THE INVENTION

The technical field of this invention is digital device functional blocks which relates generally to the area of microprocessor design and relates more specifically to the area of digital signal processor devices. In particular this invention relates to distributed service request busses such as data transfer request busses.

BACKGROUND OF THE INVENTION

The present invention deals with the data transfer connecting various memory port nodes as applied to the transfer controller with hub and ports architecture. The transfer controller with hub and ports is the subject of U.S. Pat. No. 6,496,740 claiming priority from U.K. Patent Application serial number 9909196.9 filed Apr. 21, 1999. The transfer controller with hub and ports is a significant basic improvement in data transfer techniques in complex digital systems and provides many useful features, one of which is the internal memory port which allows connection of a virtually unlimited number of processor/memory nodes to a centralized transfer controller. The centralized transfer controller must be able to transfer data from node to node with performance relatively independent of how near or remote a node might be from the transfer controller itself. To clarify the problem solved by the present invention, it is helpful to review the characteristics, architecture, and functional building blocks of the transfer controller with hub and ports.

The system problem addressed by this invention is that of sending service transaction requests from many sources. The many sources may be on a single silicon chip. The transaction requests are sent to a common central resource such as a conventional direct memory access controller. In the preferred embodiment this direct memory access controller is the transfer controller with hub and ports of the above named patent. The service requests are contained in transaction request packets composed of words, each of which may be many bits wide.

The conventional approach would be to provide dedicated buses from each potential requester to the controller. This construction has several disadvantages. It is inherently complex and requires costly hardware because the transaction requests must be serviced in parallel. The more potential requesters, the more complex such a system must be. Non-parallel transaction processing is, an alternative. This requires a centralized arbiter to determine order of servicing on service request collisions. This alternative must also force each non-serviced source to re-submit requests until acknowledged and handled. With either parallel or non-parallel transaction processing, the transaction processor would require extensive modifications for each new design adding or removing requesters. This results in poor re-usability of chip module designs, making poor use of the scarce resource of design engineers. Additionally, requesters distant from the centralized transaction processor would have longer buses. This requires extra design attention or hardware to ensure that signal paths would not be slow.

These basic limitations to conventional data transfer techniques led to the initial development of the transfer controller with hub and ports. The transfer controller with hub and ports is an unique mechanism which consolidates the functions of a direct memory access and other data movement engines in a digital signal processor system (for example, cache controllers) into a single module.

Consolidation of such functions has both advantages and disadvantages. The most important advantage of consolidation is that it will, in general, save hardware since multiple instantiations of the same type of address generation hardware will not have to be implemented.

On a higher level, it is also advantageous to consolidate address generation since it inherently makes the design simpler to modify from a memory-map point of view. For example, if a peripheral is added or removed from the system, a consolidated module will be the only portion of the design requiring change. In a distributed address system (multi-channel direct memory access for example), all instances of the direct memory access channels would change, as would the digital signal processor memory controllers.

Fundamental disadvantages of the consolidated model, however, are its inherent bottle necking, resulting from conflicting multiple requests, and its challenge to higher clock rates. Additionally, there is in general an added complexity associated with moving to a consolidated address model, just because the single module is larger than any of the individual parts it replaces.

The transfer controller with hub and ports, to which this invention relates, is a highly parallel and highly pipelined memory transaction processor. This transfer controller with hub and ports serves as a backplane to which many peripheral and/or memory ports may be attached.

Systems which contain a central mechanism for processing multiple transfer requests from multiple transfer request nodes have as an immediate challenge to solve the problem: how are conflicting transfers, i.e. transfer collisions, to be arbitrated.

In networking applications as an example, some systems technique of collision detection and random backoff to provide fair access to the network. Any station can start transmitting when it sees no activity on the network. However, in the unarbitrated state, it is possible for multiple stations to start transmitting simultaneously. Stations do not negotiate for ownership of the network. Instead stations check for the conflicting condition by receiving back what was transmitted, and checking to see if it has been corrupted (indicating a collision with another station). If this happens, all stations that started transmission simultaneously will detect the collision and abort their transmission. These stations then wait a random amount of time before attempting to start transmitting again. As each station will pick a random delay, each station eventually get to transmit its data. Over time this system could provide fair access to all stations.

Other networking systems use a technique of passing a token between the stations. A station can start transmitting only if it has the token. When it has finished, it passes the token to the next station, which can either take it and transmit data, or pass the token on again if it is not ready to transmit. This system is very fair, but is somewhat more complex and costly to implement.

A centralized data transfer controller handling multiple simultaneous data transfer requests must be designed to manage the number of independent data transfer requests in a manner which solves these collision incidents unequivocally and any system design faces obvious compromises.

SUMMARY OF THE INVENTION

This invention provides the solution to collision arbitration with fairness on a network of transfer request nodes.

The network consists of one transfer request node per transfer requester, arranged in a transfer request bus. The transfer request bus starts at an upstream node and terminates downstream at a receiver node referred to as the request bus master input.

At each node, on a given clock cycle only one of two possible transfer requests can be transmitted. First, the previous upstream node can transmit a transfer request to the present node, which it retransmits downstream. Secondly, the requester attached to the present node itself can transmit a request to the next downstream node. Arbitration of which is to occur is done by a token passing scheme.

A token signal is active at only one node on the transfer request bus. This token is passed in a downstream direction around the transfer request nodes of the bus on each clock cycle. Thus one and only one transfer request node holds the token at any given time. The token is passed from the extreme downsteam request node to the extreme upstream request node to form a token loop.

Arbitration of requests takes place as follows. If the present node is not ready to insert a transfer request from its transfer requester, then any upstream request is transmitted to the present node. This happens independent of whether the present node has the token. If the present node is ready to insert a request, it cannot occur except under certain conditions. If there is no request from an upstream node, then the present node may transmit its request downstream regardless of whether it has the token. If the present node receives a request from the immediate upstream node, then its action depends upon whether it holds the token. If the present node does not hold the token, then it must retransmit the request signal from the upstream node. If the present node holds the token, then it can transmit its own request. In this case the present node, sends a stall signal to the next upstream node, stalling its request. No requests are aborted. Any previously stalled upstream requests may proceed as soon as the token passes from the present node.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
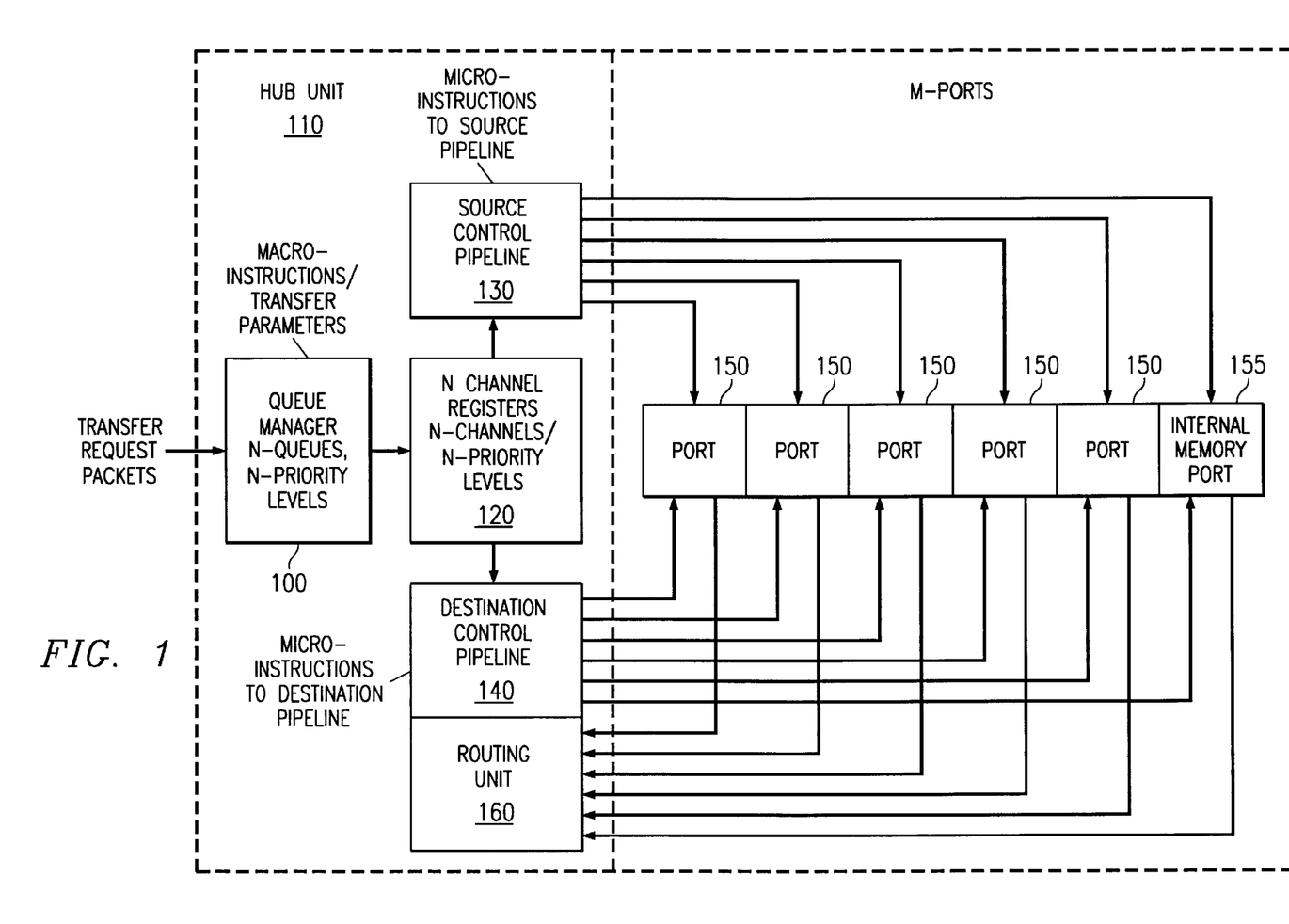
FIG. 1 illustrates a block diagram of the basic principal features of a transfer controller with hub and ports architecture transfer controller with hub and ports.

FIG. 1 illustrates a block diagram of the basic features of the transfer controller with hub and ports. The transfer controller with hub and ports is basically a data transfer controller which has at its front end portion, a queue manager 100 receiving, prioritizing, and dispatching data in the form of transfer request packets. This queue manager 100 connects within the hub unit 110 to the channel registers 120. Channel registers 120 receive the data transfer request packets and process them first by prioritizing them and assigning them to one of the N channels. Each channel represents a priority level. These channel registers 120 interface with the source control pipeline 130 and destination control pipeline 140. These are address calculation units for source (read) and destination (write) operations.

Outputs from these pipelines are broadcast to M Ports (six shown in FIG. 1 as 150 through 155). The ports 150 to 155 are clocked either at the main processor clock frequency or at a lower external device clock frequency. Read data from one port, e.g. port 150, having a destination write address of port 155 is returned to the hub destination control pipeline through the routing unit.

The transfer controller with hub and ports, to which this invention relates, introduces several new ideas supplanting the previous transfer controller technology. First, it is uniformly pipelined. In the previous transfer controller designs, the pipeline was heavily coupled to the external memory type supported by the device. In the preferred embodiment, the transfer controller with hub and ports contains multiple external ports, all of which look identical to the hub. Thus peripherals and memory may be freely interchanged without affecting the transfer controller with hub and ports. Secondly, the transfer controller with hub and ports concurrently executes transfers. That is, up to N transfers may occur in parallel on the multiple ports of the device, where N is the number of channels in the transfer controller with hub and ports core. Each channel in the transfer controller with hub and ports core is functionally just a set of registers. These registers track the current source and destination addresses, the word counts and other parameters for the transfer. Each channel is identical, and thus the number of channels supported by the transfer controller with hub and ports is highly scalable. Thirdly, the transfer controller with hub and ports includes a mechanism for queuing transfers up in a dedicated queue RAM.

Figure 2:
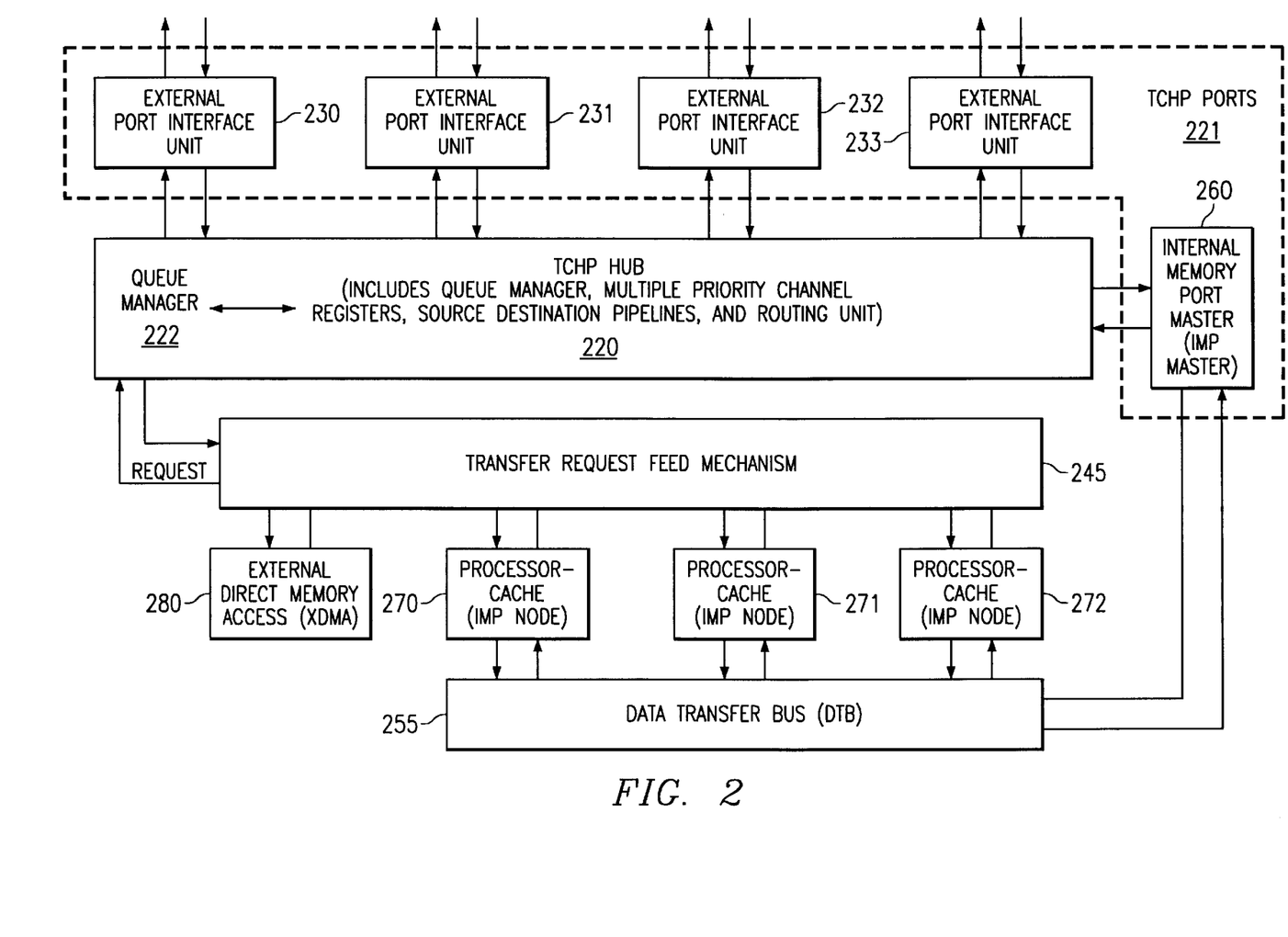
FIG. 2 illustrates the multi-processor machine with transfer controller with hub and ports architecture functional block relating to this invention, showing from a higher level, the essential elements of the transfer controller with hub and ports and its associated functional units.

FIG. 2 illustrates from a higher level an overview of a multiprocessor integrated circuit employing the transfer controller with hub and ports of this invention. There are four main functional blocks. The transfer controller with hub and ports 220 and the ports, including ports external port interface units 230 to 233 and internal memory port 260, are the first two main functional blocks. Though four external port interface units 230, 231, 232 and 233 are illustrated, this is an example only and more or less could be employed. The other two main functional blocks are the transfer request feed mechanism 245 and the data transfer bus (DTB) 255. These are closely associated functional units that are not a part of the transfer controller with hub and ports 220. Transfer request feed mechanism 245 is coupled to plural internal memory port nodes 270, 271 and 272. Though three internal port nodes 270, 271 and 272 are illustrated, this is an example only and more or less could be employed. Each of these internal memory port nodes preferable includes an independently programmable data processor, which may be a digital signal processor, and corresponding cache memory or other local memory. The internal construction of these internal memory port nodes 270, 271 and 272 is not important for this invention. For the purpose of this invention it sufficient that each of the internal memory port nodes 270, 271 and 272 can submit transfer requests via transfer request feed mechanism 245 and has memory that can be a source or destination for data. Transfer request feed mechanism 245 prioritizes these packet transfer requests. Transfers originating from or destined for internal memory port nodes 270, 271 or 272 are coupled to transfer controller with hub and ports 220 via data transfer bus 255 and internal memory port master 260. FIG. 2 highlights the possible connection of data transfer bus 255 to multiple internal memory port nodes 270, 271 and 272 and the possible connection of multiple transfer request nodes to transfer request feed mechanism 245.

With a transfer request bus allowing collisions to freely occur without backoff, the transfer request bus would inherently favor those requesters that are further upstream. The further downstream a requester is the higher the chance that it would have to delay sending its request because there are more upstream stations and therefore more chance that a request will be on the bus when it wants to send one. This unfairness may not a problem because most of the time the transfer request bus will be idle, thus providing a low collision probability. This is because each request on the transfer request bus causes a very significant amount of data to be transferred by the transfer controller with hub and ports 220. So on average, the rate at which transfer requests are submitted is low. On the other hand, although transfer requests are sent infrequently, they may be sent in a burst fashion. Thus unacceptable unfairness could occur. Suppose, for example that multiple internal memory nodes may be processing something more or less in parallel, which causes them to make similar transfer request requests at the same time.

These factors led to the adoption of a token based system. Thus a requester could not send anything until it held the token. Such a arbitration system is perfectly fair. However, possibility exists that when the transfer request bus is idle, a requester would have to wait perhaps many cycles for the token to reach it. This could occur even when the transfer request bus is idle. This would have been inefficient.

Accordingly, the prior art token system was modified in this invention. Requestors can send their requests immediately if the transfer request bus is idle. Requestors defer to upstream traffic unless they have the token. This results in low latency when the transfer request bus is idle, and fair access to the transfer request bus when it is busy. This system has other attributes as follows. Each node on the transfer request bus is bounded by clocked flip flops. This makes the design inherently scalable to basically any number of transfer request nodes. For example, the loading on any transfer request node is independent of the number of devices. No special attention is required to avoid performance degradation in transfer request nodes more distant from the centralized controller. Note that transfer request nodes more distant from the centralized controller have an advantage by virtue of being more upstream from other nodes. When the system of the present invention is used with a transfer controller with hub and ports, as in the preferred embodiment, the transfer controller with hub and ports need not be modified if the number of transfer requesters is changed. Expressed another way, the transfer controller with hub and ports design can be highly modular. The modularity of the transfer request bus is a significant component of the modularity of the transfer controller with hub and ports.

Figure 3:
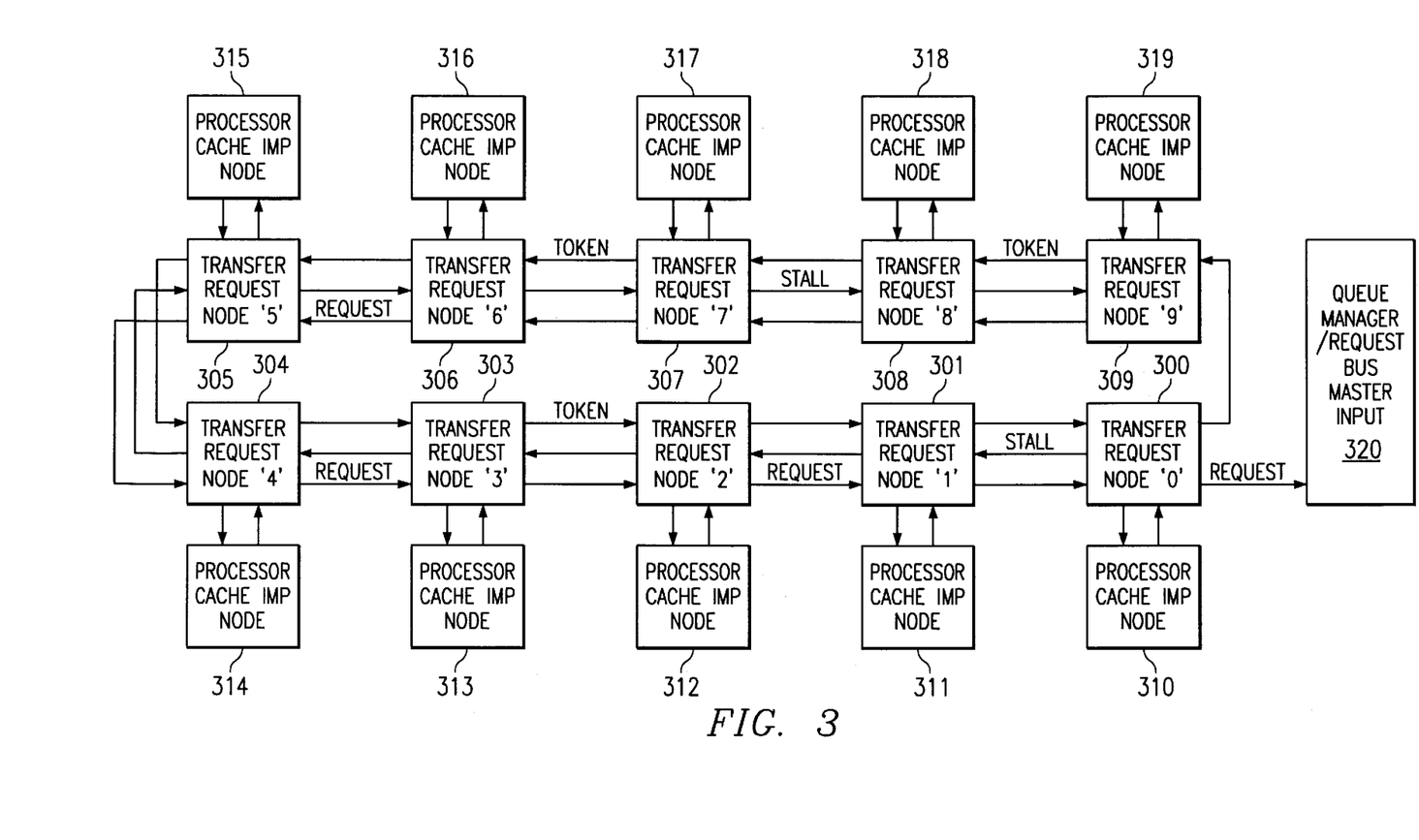
FIG. 3 illustrates the functional block diagram of the transfer request data bus of this invention.

FIG. 3 illustrates the connection of transfer request nodes in a bus with nodes labeled 300 through 309. Node 300, being nearest to the queue manager request bus master input 320, is referred to as the nearest or most downstream node. Node 309 is referred to as the farthest or most upstream node. At each transfer request node, a processor/cache internal memory node (nodes 310 through 319) is attached. These processor cache internal memory nodes 310 to 319 are the same as processor/cache internal memory nodes 270, 271 and 272 illustrated in FIG. 2. Each of these processor/cache internal memory nodes has the capability for placing local transfer requests on the bus.

When there is no local request, transfer requests are passed from one node downstream to the next node. Such transfer requests ultimately reach queue manager request bus master input 320 for service of the transfer request. An upstream request has priority for being passed onward until a local request becomes active. In this case, the transfer request node determines if the token is present. If not, the local request stalls. The token is simply a signal circulated in the upper path, marked "token" in FIG. 3, around the transfer request nodes. The token moves one position each clock cycle. This movement is downstream like the transfer requests. After reaching transfer request node "0" 300, the token wraps around to transfer request node "9" 309. Conversely, if the token is present and a local request is active, the upstream request must be stalled to allow the local request to take priority. As previously stated, if no upstream request is present to be passed through a given transfer request node, then any local request may be placed on the local transfer request node regardless of the presence of the token. The middle path marked "stall" carries the individual stalls which hold off upstream requests in favor of local requests having the token. The lower path marked "requests" in FIG. 3 represents the flow of "requests" from upstream nodes toward downstream nodes.

Figure 4:
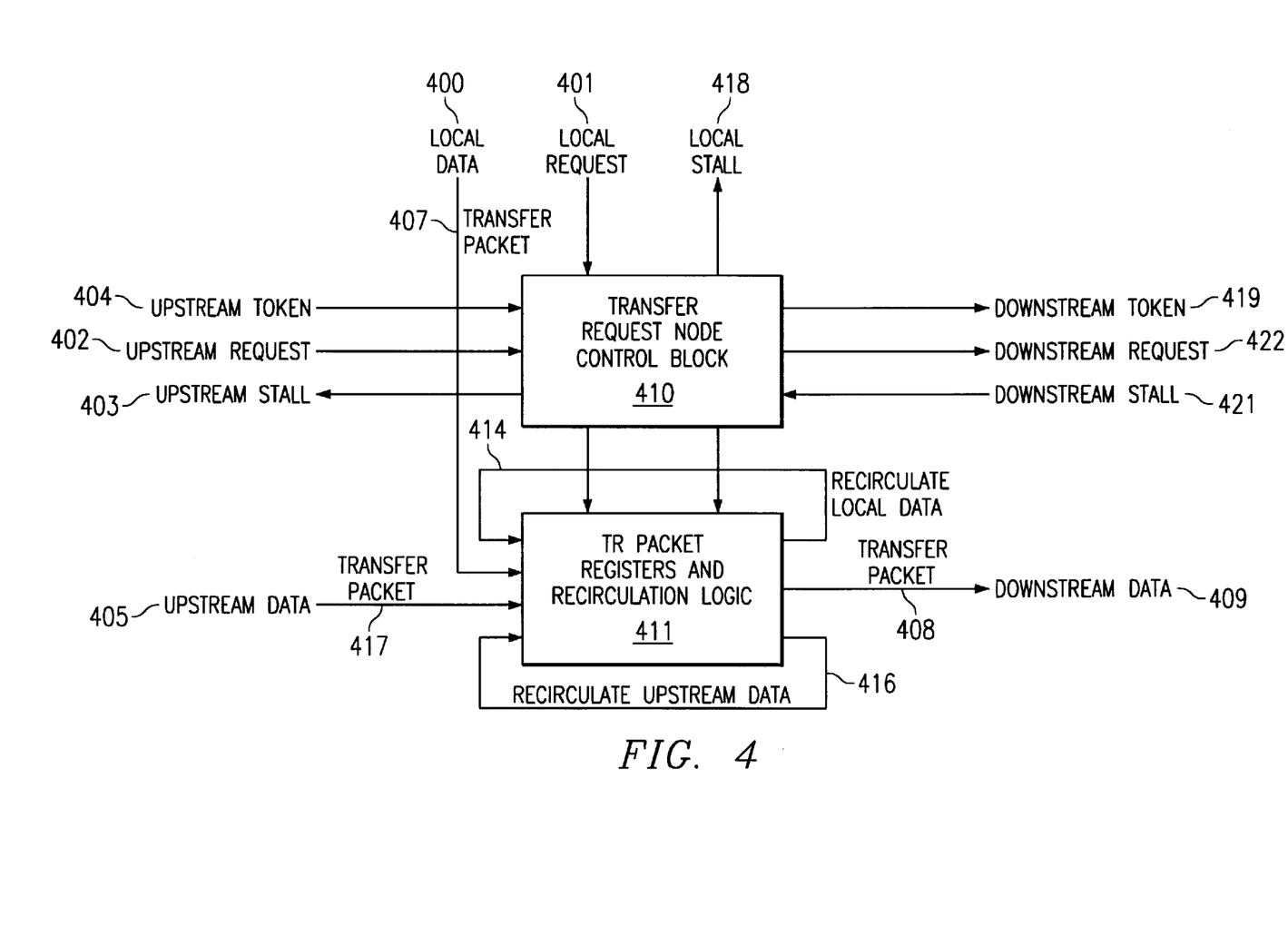
FIG. 4 is a more detailed block diagram of the transfer request node of each internal memory port node illustrated in FIG. 3.

FIG. 4 illustrates the basic structure for a transfer request node 300. Each transfer request node 300 to 309 preferably has this structure. In FIG. 4 the request path illustrated in FIG. 3 is divided into a request path and a transfer request packet path. Each request for service preferably includes both a request and data in a packet. In the preferred embodiment the packet indicates the data to be transferred by, for example, source and destination addresses and data size. Local requests for service from the corresponding processor/cache internal memory port node 310 to 319 are received on local request input 401 and local transfer data packets 407 are received on local data input 400. Requests for service from upstream nodes are received on upstream request input 402 and upstream transfer data packets 417 are received on upstream data input 405. Local request input 401 and upstream request input 402 are connected to transfer request node control block 410. Transfer request node control block 410 also receives the token on upstream token input 404 and a downstream stall signal from a downstream node on downstream stall input 421. Transfer request node control block 410 produces a downstream request signal on downstream request output 422, an upstream stall signal on upstream stall output 403, a local stall signal on local stall output 418 and supplies the token to the downstream node on downstream token output 419.

The transfer packet data is handled by transfer request packet registers and recirculation logic 411. Transfer request packet registers and recirculation logic 411 receives local transfer data packet 407 and upstream transfer data packet 417. Transfer request packet registers and recirculation logic 411 supplies downstream data packet 408 to the downstream node on transfer data packet output 409. Transfer request packet registers and recirculation logic 411 also includes a local data recirculation path 414 and an upstream data recirculation path 416. The local data packet recirculates during a local stall. Similarly, the upstream data packet recirculates during an upstream stall.

Transfer request node control block controls operation of the transfer request node as shown in Table 1.

TABLE 1

| Inputs | | | Outputs | | |
|---|---|---|---|---|---|
| Upstream Request | Local Request | Token | Downstream Request | Upstream Stall | Local Stall |
| No | No | — | None | No | No |
| Yes | No | — | Upstream Request | No | No |
| Yes | Yes | Absent | Upstream Request | No | Yes |
| Yes | Yes | Present | Local Request | Yes | No |
| No | Yes | — | Local Request | No | No |

Note that unless the transfer request node control block receives a transfer request from both the upstream node and the current node, the presence or absence of the token is not relevant. The token is used only to resolve priority when both an upstream request and a local request occur simultaneously. Accordingly, Table 1 shows a "- - -" or "don't care" status for the token for these conditions.

Figure 5:
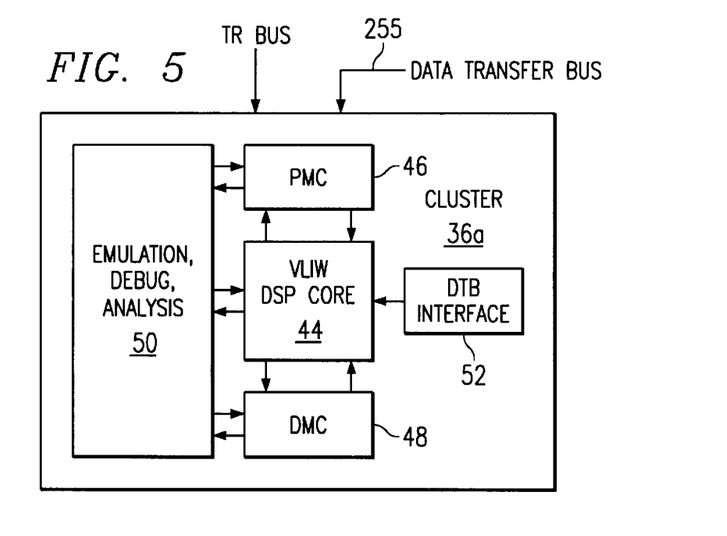
FIG. 5 illustrates a block diagram form an example of one of the multiple processors illustrated in FIG. 2.

FIG. 5 illustrates a block diagram of an example of a preferred processor and cache memory combination implementing the internal memory nodes 270, 271 and 272 of FIG. 2. Each internal memory node 270, 271 and 272 preferably includes a digital signal processor core and corresponding instruction and data cache memory. Transfer controller with hub and ports 220 provides for all data communication among internal memory nodes 270, 271 and 272, external input/output (I/O) devices and peripherals at external ports 230 to 233, and internal memory at internal memory port master 260. Each internal memory node 270, 271 and 272 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Internal memory nodes 270, 271 and 272 and transfer controller with hub and ports 220 communicate over a pair of high throughput buses. Transfer request feed mechanism 245 is used by digital signal processor cores 44 to specify and request transactions in transfer controller with hub and ports 220. Data transfer bus (DTB) 255 is used to load and store data from objects in the global memory map. While any given digital signal processor core 44 can access its own internal local memory within the cluster without permission from transfer controller with hub and ports 220, any access to global memory outside of its local memory requires a transfer controller directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 6:
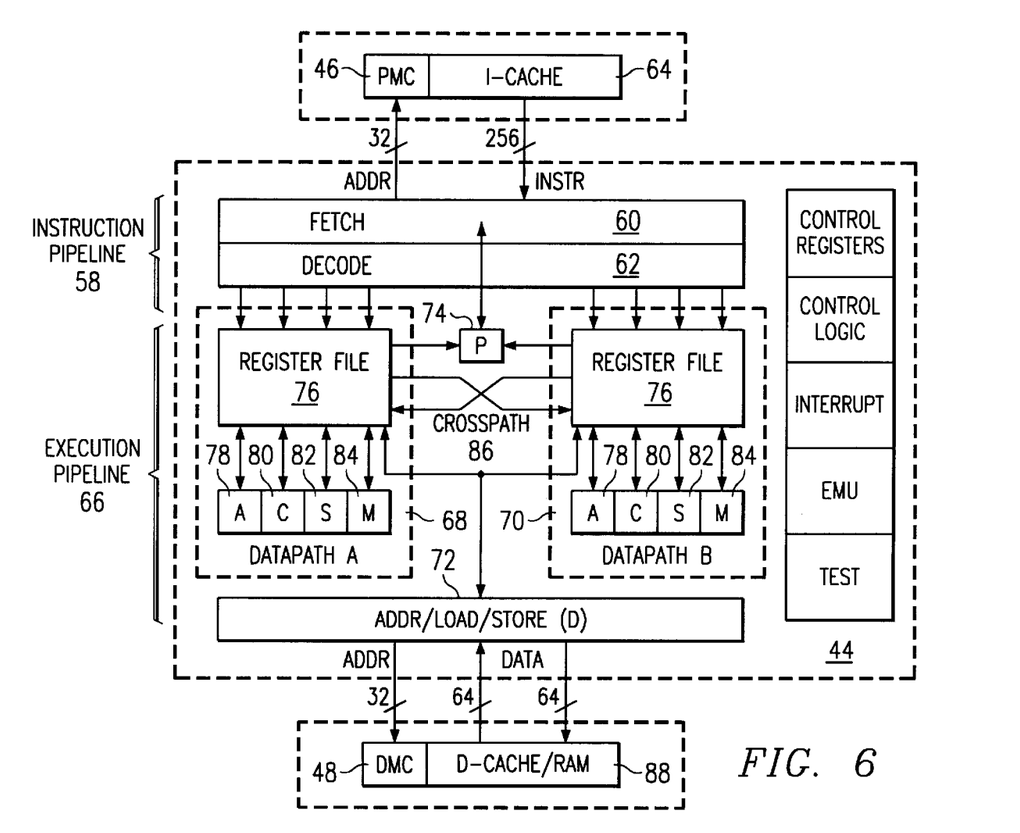
FIG. 6 illustrates further details of the very long instruction word digital signal processor core illustrated in FIG. 5.

FIG. 6 is a block diagram illustrating more detail of digital signal processor core 44 illustrated in FIG. 5. Digital signal processor core 44 is a 32-bit eight-way VLIW pipelined processor. The instruction set consists of fixed length 32-bit reduced instruction set computer (RISC) type instructions that are tuned for digital signal processing applications. Almost all instructions perform register-to-register operations and all memory accesses are performed using explicit load/store instructions. As shown in FIG. 6, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group D-unit group 72, and a common branch unit group P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66. Eight of these units may be scheduled concurrently every cycle. Each functional unit group contains plural functional units, some of which are duplicated between unit groups. In total there are nine 32-bit adders, four 32-bit shifters, three boolean operators, and two 32 bit by 16 bit multipliers. The multipliers are each configurable into two 16 bit by 16 bit multipliers or into four 8 bit by 8 bit multipliers. The memory at internal memory nodes 270, 271 and 272 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request data transfers in is several ways. Digital signal processor core 44 may issue a data transfer request to transfer controller with hub and ports 220 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by transfer controller with hub and ports 220. Thus any digital signal processor core 44 may transfer data internally or externally and load or read any internal memory node.

Each digital processor core 44 preferably also includes automatic mechanisms for generating requests for data transfer for cache service. Thus an instruction cache miss preferably causes program memory controller 46 to generate a data transfer request from another data source to fill a line of instruction cache 64 with data including program instructions stored at the address generating the cache miss. Similarly, a data cache miss on a data read preferably causes data memory controller 48 to generate a data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit. There are two alternatives for data cache misses on data writes. In a write through mode, a data write by digital processor core 44 that misses data cache/random access memory 88 causes data memory controller 48 to generate a data transfer request to store the write data in the appropriate location in a higher level of memory. In a writeback mode, a data write by digital processor core 44 that misses data cache/random access memory 88 causes data memory controller 48 to generate a data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a data transfer request to handle data writeback to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Transfer controller with hub and ports 220 is preferably employed for this writeback of evicted dirty cache entries.

This priority technique operates fairly under a variety of loading conditions. When loading is light and there is a low probability of generating a local request or receiving an upstream request, there are few collisions. Under these conditions nearly all local requests are immediately transmitted downstream. During moderate loading the upstream nodes have a greater probability of passing to the queue master node but are further away than the downstream nodes.

During heavy loading when there is a high probability of both receiving an upstream request and generating a local request, the token ensures each node has fair access. Thus the priority technique of this invention provides generally fair access to all nodes under all conditions. This technique is scalable by the selection of the number of nodes. The loading on each node is independent of the number of nodes because each node connects to only its neighbors. The greater the number of nodes, the longer the average path to the queue manager request bus master and hence the longer the average latency between transmission of a request and its receipt. However, this effect is often swamped by the stalls produced when a node with the token generates a local request, particularly under heavy loading. Additionally when there are more nodes, each node inherently has a longer average latency between the issue of a local request and its service. Accordingly, this is not a strong disadvantageous factor.

This invention has been described in conjunction with the preferred embodiment in which the requests are for data transfer. Those skilled in the art would realize that this type request is not only type that can be serviced by this invention. This invention can be used to connect and prioritize any data processing function that can be requested by plural requesters and is serviced by a central application unit.

What is claimed is:

1. A method of scheduling service requests from a plurality of nodes, each capable of generating a service request, said method comprising the steps of:

disposing the plurality of nodes in a chain having an upstream most node and a downstream most node, said downstream most node connected to an application device capable of servicing the service requests;

sequentially passing a token among the plurality of nodes from the upstream most node to the downstream most node following the chain, said token passing from the downstream most node to the upstream most node in a loop;

determining at each node whether a service request is received from a next upstream node;

determining at each node whether that node generates a service request;

determining at each node whether that node holds the token;

passing a service request received at one of the plurality of nodes from a next upstream node to a next downstream node if that node does not generate a service request, the downstream most node passing the service request to the application device;

passing a service request received at one of the plurality of nodes from the next upstream node to the next downstream node if that node generates a service request and that node does not hold the token;

passing a service request generated by a node to the next downstream node if that node generates a service request and does not receive a service request from the next upstream node; and passing a service request generated by a node to the next downstream node if that node generates a service request and that node holds the token.

2. The method of claim 1, wherein:

sending a stall signal from a node to the next upstream node if that node generates a service request, holds the token and receives a service request from the next upstream node or if that node receives a stall signal from the next downstream node; and stalling passing a service request from a node to the next downstream node if that node receives a stall signal.

3. The method of claim 1, wherein:

said service requests are data transfer requests for transfer of data; and transferring data under control of said application device in response to receipt of a data transfer request.

4. The method of claim 3, wherein:

a step of generating a data transfer request generates an indication of source address, an indication of destination address and an indication of data amount.

5. The method of claim 3, wherein each of the plurality of nodes includes a data processor and an instruction cache for temporarily storing program instructions controlling the data processor, the method further comprising:

generating at a node a data transfer request for program cache fill from a system memory upon a read access miss to the instruction cache of that node;

transferring data under control of said application device from a system memory to the instruction cache of a node generating a data transfer request for program cache fill.

6. The method of claim 3, wherein each of plurality of nodes includes a data processor and a data cache for temporarily storing data employed by the data processor, further comprising:

generating at a node a data transfer request for data cache fill from a system memory upon a read access miss to said data cache of that node; and transferring data under control of said application device from a system memory to the data cache of a node generating a data transfer request for data cache fill.

7. The method of claim 3, wherein each of the plurality of nodes includes a data processor and a data cache for temporarily storing data employed by the data processor, further comprising:

generating at a node a data transfer request for data writeback to a system memory upon a write miss to said data cache of that node; and transferring data under control of said application device from a node generating a data transfer request for data writeback to the system memory.

8. The method of claim 3, wherein each of the plurality of nodes includes a data processor and a data cache for temporarily storing data employed by the data processor, further comprising:

generating at a node a data transfer request for write data allocation from a system memory to said data cache upon a write miss to said data cache of that node; and transferring data under control of said application device from a system memory to the data cache of a node generating a data transfer request for write data allocation.

9. The method of claim 3, wherein each of the plurality of nodes includes a data processor and a data cache for temporarily storing data employed by the data processor, further comprising:

generating at a node a data transfer for data writeback to said system memory upon eviction of dirty data from the data cache of that node; and transferring data under control of said application device from a node generating a data transfer request for eviction of dirty data to the system memory.

10. A data processing apparatus comprising:

an application device capable of servicing requested data processing operations in response to corresponding service requests;

a plurality of nodes disposed in a chain having an upstream most node and a downstream most node, each of said plurality of nodes having
  an operation unit capable of generating service requests,
  a token input for receiving a token from a next upstream node in said chain, said token input of said upstream most node receiving said token from said downstream most node,
  an upstream service request input for receiving a service request from a next upstream node in said chain, said upstream most node not receiving any signal on said upstream service request input,
  a local service request input for receiving a service request from said operation unit,
  a token output for supplying said token to a next downstream node in said chain, said downstream most node supplying said token to said token input of said upstream most node,
  a downstream service request output for supplying a service request to a next downstream node in said chain, said downstream most node supplying said service request to said application device,
  a control block connected to said token input, said token output, said upstream service request input, said local service request input and said downstream service request output, said control block operative to
    pass said token from said upstream most token input to said downstream token output,
    pass a service request received at said upstream service request input to said downstream service request output if that node does not generate a local service request, the downstream most node passing the service request to the application device;
    pass a service request received at said next upstream service request input to said downstream service request output if that node generates a local service request and that node does not hold the token;
    pass a local service request to said downstream service request output if that node generates a local service request and does not receive a service request from said upstream service request input; and
    pass a local service request to said downstream service request output if that node generates a local service request and that node holds the token.

11. The data processing apparatus of claim 10, wherein:
each node further includes
  a downstream stall input for receiving a stall signal from a next downstream node, said downstream most node not receiving any signal on said downstream stall input, and
  an upstream stall output for supplying a stall signal to said downstream stall input of a next upstream node, said upstream stall output of said upstream most node not connected; and
wherein said control block is further operative to
  generate a stall signal on said upstream stall output if that node generates a local service request, receives a service request from said upstream service request input and that node holds the token or if that node receives a stall signal from said next downstream node, and
  stall supply of a service request on said downstream service request output if that node receives a stall signal on said downstream stall input.

12. The data processing apparatus of claim 10, further comprising:
a system memory connected to said application device;
wherein said operation unit of each node is capable of generating data transfer service requests; and
wherein said application device is capable of transferring data with said system memory in response to data transfer service requests.

13. The data processing apparatus of claim 12, wherein:
said operation unit of each node is capable of generating said data transfer service requests including a transfer data packet including an indication of source address, an indication of destination address and an indication of data amount;
each node further includes
  a transfer data packet input for receiving a transfer data packet from a next upstream node, said upstream most node not receiving any signal on said transfer data packet input, and
  a transfer data packet output for supplying a transfer data packet to said transfer data packet input of a next downstream node, said transfer data packet output of said downstream most node connected to said applications device; and
said applications device controlling data transfer from an address corresponding to said indication of source address, to an address corresponding to said indication of destination address and in an amount corresponding to said indication of data amount.

14. The data processing apparatus of claim 12, wherein:
each of said plurality of nodes includes a data processor and an instruction cache for temporarily storing program instructions controlling said data processor, said data processor generating a data transfer service request for program cache fill from said system memory upon a read access miss to said instruction cache; and said application device transferring data from said system memory to said instruction cache of a node generating a data transfer request for program cache fill.

15. The data processing apparatus of claim 12, wherein:

each of said plurality of nodes includes a data processor and a data cache for temporarily storing data employed by said data processor, said data processor generating a data transfer service request for data cache fill from said system memory upon a read access miss to said data cache;

said application device transferring data from said system memory to said data cache of a node generating a data transfer request for data cache fill.

16. The data processing apparatus of claim 12, wherein:

each of said plurality of nodes includes a data processor and a data cache for temporarily storing data employed by said data processor, said data processor generating a data transfer service request for data writeback to said system memory upon a write miss to said data cache; and said application device transferring data from said data cache of a node generating a data transfer service request for data writeback to said system memory.

17. The data processing apparatus of claim 12, wherein:

each of said plurality of nodes includes a data processor and a data cache for temporarily storing data used by said data processor, said data processor generating a data transfer service request for write data allocation from said system memory to said data cache upon a write miss to said data cache; and said application device transferring data from said system memory to said data cache of a node generating a data transfer service request for write data allocation.

18. The data processing apparatus of claim 12, wherein:

each of said plurality of nodes includes a data processor and a data cache for temporarily storing data used by said data processor, said data processor generating a data transfer for data writeback to said system memory upon eviction of dirty data from said data cache;

said application device transferring data from to said data cache of a node generating a data transfer service request for data writeback to said system memory.

19. The data processing apparatus of claim 12, wherein:

said application device and said plurality of nodes are disposed on a single integrated circuit.

\* \* \* \* \*